United States Patent [19]

Cheng et al.

[11] Patent Number: 5,571,888
[45] Date of Patent: Nov. 5, 1996

[54] PROCESS FOR PREPARING FLAME-RETARDANT PHOSPHORUS-CONTAINING UNSATURATED POLYESTER

[75] Inventors: Yi-Ni Cheng, Taipei; Shinn-Jen Chang, Hsinchu; Yuung-Ching Sheen, Tainan Hsien; Shyue-Pyng Juang, Taipei Hsien, all of Taiwan

[73] Assignee: Industrial Technology Research Institute, Hsinchu, Taiwan

[21] Appl. No.: 490,427

[22] Filed: Jun. 14, 1995

[51] Int. Cl.⁶ .................................................. C08G 63/692
[52] U.S. Cl. ........................ 528/287; 528/274; 528/277; 528/283; 524/603
[58] Field of Search .................................. 528/275, 277, 528/287, 274; 524/603

[56] References Cited

U.S. PATENT DOCUMENTS

| | | | |
|---|---|---|---|
| 3,433,854 | 3/1969 | Apice | 528/287 |
| 3,662,025 | 5/1972 | Buck | 528/287 |
| 4,360,647 | 11/1982 | Hefner, Jr. | 525/445 |

FOREIGN PATENT DOCUMENTS 0101494  8/1975  Japan.

*Primary Examiner*—Tae Yoon
*Attorney, Agent, or Firm*—Sughrue, Mion, Zinn, Macpeak & Seas

[57] ABSTRACT

A process for preparing a flame-retardant phosphorus-containing unsaturated polyester resin blend, comprising the following steps:

(a) reacting
(1) a phosphorus-containing monomer having the formula:

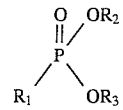

wherein $R_1$, $R_2$ and $R_3$ are respectively H, $C_1$–$C_4$ alkyl, phenyl, alkaryl or aralkyl, with
(2) a saturated dicarboxylic acid, or a saturated dicarboxylic acid anhydride,
(3) a double bond-containing unsaturated dicarboxylic acid or a double bond-containing unsaturated dicarboxylic acid anhydride, and
(4) a diol in the presence of a metal catalyst combined with an acid to form an unsaturated polyester oligomer having the formula:

$$HO-(C-R_4-C-O-R_5-O)_x-(C-R_6-C-O-R_5-O)_y-(P-O-R_5-O)_z-H$$

(with carbonyl O's on each C and =O on P, with $R_1$ substituent on P)

wherein
$R_5$ and $R_6$ are respectively $C_1$–$C_4$ alkylene, alkarylene, phenylene or aralkylene,
$R_4$ is a vinyl-containing group,
x is an integer of 1–10,
y is an integer of 1–10,
z is an integer of 1–10, and (b) blending said unsaturated polyester oligomer with a vinyl-containing monomer.

15 Claims, No Drawings

PROCESS FOR PREPARING FLAME-RETARDANT PHOSPHORUS-CONTAINING UNSATURATED POLYESTER

BACKGROUND OF THE INVENTION

The present invention relates to a process for preparing a flame-retardant phosphorus-containing unsaturated polyester.

Flame-retardant unsaturated polyesters can be obtained by adding flame retardants such as aluminum hydroxide and halogen combined with antimonous oxide or phosphorus/halide to unsaturated polyester, followed by blending the resulting polyester with polymerizable monomer containing a vinyl group. This method has the advantages of convenience and low manufacturing cost. However, to attain the flame-retardant effects, the amount of the additives, i.e. flame retardants, to be added is large, generally 50 wt %. Also, the additives sometimes are detrimental to the physical properties of the polyester resin-blends, and cause the migration of the flame retardants to the surface of the fabricated products, resulting in the lowering of the flame-retardant effect. Moreover, increments of inorganic flame retardants causes the increase of viscosity of polyester, resulting in the difficulties in their processing, such as extrusion or injection molding.

Flame-retardant unsaturated polyester can also be obtained by directly reacting flame retardants, such as halogen or phosphorus/halides into the polyester molecular structure, followed by blending the resulting polyester with polymerizable monomer containing a vinyl group. The polyesters thus prepared are free of the disadvantages mentioned above. However, the manufacturing cost is high, and thus this method is also unsatisfactory. For example, in U.S. Pat. No. 3,662,025, it discloses a phosphorus-containing unsaturated polyester which is prepared by blending a hydroxyl terminated unsaturated polyester and an ethylenically unsaturated monomer having a vinyl group. The hydroxyl terminated unsaturated polyester is prepared by reacting an unsaturated dicarboxylic acid or acid anhydride and a molar excess of glycol. The hydroxyl terminated unsaturated polyester is then reacted with a phosphonate intermediate which is the reaction product of a phosphonate and an organic hydroxy acid or a lactone. The process for preparing the hydroxyl terminated unsaturated polyester involves a three-step synthesis and requires charging the reactants in several batches, and thus is not economical.

SUMMARY OF THE INVENTION

It is therefore an object of the invention to provide a process for the preparation of flame-retardant phophorus-containing unsaturated polyester, in which the reaction temperature of the unsaturated polyester can be lowered, and thus all the reactants can be charged in one single reactor simultaneously and the whole process is finished in one single step.

In the process of the invention, a metal catalyst combined acid is used to lower the reaction temperature of the copolyesterification of unsaturated dicarboxylic acids, saturated dicarboxylic acids, diols, and phosphorus compounds to form phosphorus-containing unsaturated polyester oligomer. The polyester oligomer is then blended with a double bond-containing monomer to form the flame-retardant polyester.

According to an aspect of the invention, by controlling the amount of phsophorus compound to be added, the phosphorus content of the flame-retardant unsaturated polyester can be easily adjusted.

According to another aspect of the invention, the physical properties of the resulting unsaturated polyester are not degraded, and thus can be fabricated into various flame-retardant plastic articles for different uses.

The present invention can be more fully understood by reference to the following detailed descriptions.

DETAILED DESCRIPTION OF THE INVENTION

According to the process of the invention, the esterification is conducted by simultaneously charging the phosphorus compound, the saturated dicarboxylic acids or acid anhydrides, the unsaturated dicarboxylic acids or acid anhydrides, the diols and the metal catalyst combined acids in one single reactor which has been purged with nitrogen, and then reacting at a temperature of 140°–190° C., preferably 150°–180° C. with the fractionating temperature being controlled at 90°–105° C., for about 8–10 hours until the acid value of the reaction mixture increases to 70–90 mg KOH/g and shows no significant change. The reactor is then evacuated for 1–3 hours to 10–20 torr to obtain unsaturated polyester oligomers. The obtained oligomers are then blended (diluted) with double bond-containing reactive monomers and promoters such as amines to finish the process.

The phosphorus compounds suitable for use in the invention have the following structure:

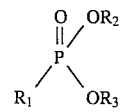

wherein $R_1$, $R_2$ and $R_3$ are respectively H, $C_1$–$C_4$ alkyl, phenyl, alkaryl and aralkyl. Examples of the phosphorus compounds are: phenyl phosphonic acid, dimethyl methyl phosphonate, diethyl ethane phsophonate, diethyl methane phsophonate, dimethyl ethane phosphonate, dipropyl butane phsophonate, diisobutyl benzene phosphonate, and diphenyl hexene phosphonate.

The saturated dicarboxylic acids or acid anhydrides, the unsaturated dicarboxylic acids or acid anhydrides, and the diols suitable for use in the invention are those usually being used in the preparation of unsaturated polyesters. Examples of the saturated dicarboxylic acids or acid anhydrides are orthophthalic acid, phthalic anhydride, isophthalic acid, tetrahydrophthlaic acid, hexahydrophthalic acid, tetrachlorophthalic acid, adipic acid, dimerized linseed oil fatty acid, and soy bean oil fatty acid, soy bean fatty acid anhydride. A mixture of the above saturated diacids can also be used according to the invention.

Examples of the unsaturated dicarboxylic acids or acid anhydrides acids are maleic acid, maleic anhydride, fumaric acid, itaconic acid, citraconic acid, mesaconic acid, and aconic acid. A mixture of the above unsaturated dicarboxylic acids can also be used.

Examples of the diols are ethylene glycol, propylene glycol, dimethyl glycol, dipropylene glycol, 1,4-butanediol, neopentyl glycol, pentyl glycol, oxyalkylated bisphenol, hydrogened bisphenol. A mixture of the above diols can also be used.

The catalyst used in the esterification of the invention is a metal catalyst. Note the metal catalyst must be used in combination with an acid. The metal catalyst can be an organo-tin compound or a metal oxide. Examples of the organo-tin compound include but not limit to dibutyl tin oxide, dibutly tin acetate, tin oxalate and tin chloride. Examples of metal oxides include but not limit to alkali metal oxides such as, alkaline erath metal oxides, and transition metal oxides. Preferred examples of the metal oxides are antimony oxide, zinc oxide and calcium oxide. Examples of the acids are toluene sulfonic acid, sulfuric acid, hydrochloric acid, phosphoric acid, and trichloro phosphate. The amount of the metal catalyst is 0.01–0.8 wt %, preferably 0.1–0.5 wt % the amount of said acid is 0.01–0.6 wt %, preferably 0.05–0.4 wt % based on the total amount of the saturated dicarboxylic acid or the anhydrides thereof and the unsaturated dicarboxylic acid or the anhydrides thereof.

According to the esterification of the invention, the molar ratio of diol to total dicarboxylic acid is 1.03:1.0 to 3.0:1.0, the molar ratio of saturated dicarboxylic acid to unsaturated dicarboxylic acid is 0.05:0.95 to 0.95:0.05, and the molar ratio of phosphorus-containing monomer to dicarboxylic acid is 0.05:0.95 to 0.95:0.05.

To maintain the stability of the esterification, hindered phenols serving as stabilizers are generally added to the reaction mixture. The amount of the hindered phenols is 0.01–0.5 wt % based on the total amount of the saturated dicarboxylic acid and unsaturated dicarboxylic acid.

The phosphorus-containing unsaturated polyesters thus prepared have the structure:

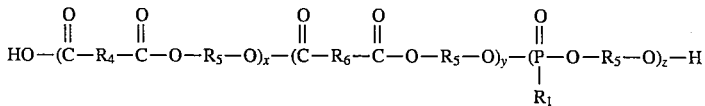

wherein $R_1$ is H, $C_1$–$C_4$ alkyl, phenyl, alkaryl and aralkyl, $R_5$ and $R_6$ are respectively $C_1$–$C_4$ alkylene, alkarylene, phenylene, or aralkylene, $R_4$ is a vinyl-containing group, x is a integer of 1–10, y is an integer of 1–10, and z is an integer of 1–10.

The above unsaturated polyesters have a viscosity of 300–3000 Cps, a molecular weight of 1000–4000, and a phosphorus content of 0.1–10%.

The double bond-containing monomers used for diluting the polyester oligomer are those reactive monomers containing vinyl functional groups, for example styrene, methyl methacrylate, vinyl toluene, divinyl benzene, methyl acrylate, ethyl acrylate, ethyl methacrylate, n-butyl methacrylate, ethyl acrylate, n-butyl methacrylate, n-butyl acrylate, 2-ethyl hexyl acrylate, methacrylate, diallyl phthalate, dially fumarate, and vinyl acetate. The amount of the vinyl containing monomers are 10–40 wt % of the unsaturated polyester oligomer. Moreover, inhibitors, for example hydroquinone, benzoquinone, 1,4-naphthoquinone, 2,5-diphenyl-p-benzoquinone, and p-tert-butylpyrocatechol should also be added together with the double bond-containing monomers. The amount of the inhibitors are generally 20–100 ppm.

The examples which follow illustrate in detail the invention.

EXAMPLE 1

A four-neck reaction flask fitted with a stirrer, a fractional condenser, a nitrogen inlet valve and a heating mantle, was evacuated, then purged with nitrogen and preheated to 100° C. 216 g of maleic anhydride, 133 g of phthalic anhydride, 112 g of dimethyl methyl phosphonate, 375 g of propylene glycol, 0.72 g of Irganox 1222, 0.72 g of tin oxalate, and 1.38 g of p-toluene sulfonic acid were charged to the flask simultaneously, heated to 155° C. for copolymerization for about 12 hours. The acid value and fractions were monitored and recorded during the reaction. After the acid value increased to 70–90 mg. KOH/g and became unchanged, the fractional condenser was removed, and the nitrogen inlet valve was closed. The reaction flask was then evacuated to 10 torr for about 2 hours to give a colorless, transparent tackified liquid of unsaturated polyester oligomer. 70 parts of the obtained polyester oligomer was then blended with 30 parts of styrene, and 40 ppm of hydroquinone was added to the blend, stirred intimately to give a final unsaturated polyester resin blend. Cured specimens were prepared, and the LOI (limit oxygen index)and self-extinguishing were measured in accordance with ASTM D2863. The results were summarized in Table 1.

EXAMPLE 2

To the reaction flask as described in Example 1 were added 235 g of maleic anhydride, 118 g of phthalic anhydride, 99 g of dimethyl methyl phosphonate, 395 g of propylene glycol, 0.9 g of dibutyl tin oxide, and 1.36 g of p-toluene sulfonic acid simultaneously. The temperature was raised to 170° C. for copolymerization for about 8–10 hours. The acid value and fractions were monitored and recorded during the reaction. After the acid value became unchanged, the fractional condenser was removed, and the nitrogen inlet valve was closed. The reaction flask was then evacuated for about 1.5 hours to give a colorless, transparent tackified liquid of unsaturated polyester oligomer. 60 parts of the obtained polyester oligomer was then blended with 40 parts of styrene, and 40 ppm of hydroquinone and 20 ppm of t-butyl catechol were added, stirred intimately to give unsaturated polyester resin blend. Cured specimens were prepared and the LOI and self-extinguishing were measured by the same method. The results are also summarized in Table 1.

EXAMPLE 3

To the reaction flask as described in Example 1 were added 323 g of maleic anhydride, 133 g of phthalic anhydride, 284 g of phenyl phosphonic acid, 186 g of ethylene glycol, 242 g of propylene glycol, 1.48 g of dibutyl tin oxide, 1.48 g of Irganox 1010, and 2.22 g of p-toluene sulfonic acid simultaneously. The temperature was raised to 160° C. for copolymerization. The acid value and fractions were monitored and recorded during the reaction. After the acid value became unchanged, the fractional condenser was removed, and the nitrogen inlet valve was closed. The reaction flask was then evacuated for about 2 hours to give a colorless, transparent viscous liquid of unsaturated polyester oligomer. 60 parts of the obtained polyester oligomer was then blended with 40 parts of a 70/30 mixture of styrene and methyl methacrylate, and 50 ppm of hydroquinone was added, stirred intimately to give an unsaturated polyesterresin blend. Cured specimens were prepared, and the LOI and self-extinguishing were measured by the same method. The results are also summarized in Table 1.

EXAMPLE 4

To the same reaction flask as described in Example 1 were added 529 g of maleic anhydride, 446 g of dimethyl methyl phosphonate, 614 g of ethylene glycol, 1.95 g of tin chloride, and 1.95 g of p-toluene sulfonic acid simultaneously. The temperature was raised to 155° C. for copolymerization for about 12 hours. The acid value and fractions were monitored and recorded during the reaction. After the acid value became unchanged, the fractional condenser was removed, and the nitrogen inlet valve was closed. The reaction flask was then evacuated for about 2 hours to give a colorless, transparent viscous liquid of unsaturated polyester oligomer. 65 parts of the obtained polyester oligomer was then blended with 35 parts of a 50/50 mixture of styrene and methyl methacrylate, and 50 ppm of hydroquinone was added, stirred intimately to give unsaturated polyesterresin blend. Cured specimens were prepared, and the LOI and self-extinguishing were measured by the same method. The results are also summarized in Table 1.

COMPARATIVE EXAMPLE 1

To the reaction flask as described in Example 1 were added 537 g of maleic anhydride, 666 g of phthalic anhydride, 1140 g of propylene glycol, and 2.41 g of tin chloride simultaneously.

The temperature was raised to 155° C. for copolymerization for about 12 hours. The acid value and fractions were monitored and recorded during the reaction. After the acid value became unchanged, the fractional condenser was removed, and the nitrogen inlet valve was closed. The reaction flask was then evacuated for about 2 hours to give a colorless, transparent viscous liquid of unsaturated polyester oligomer. 70 parts of the obtained polyester oligomer was then blended with 30 parts of styrene, and 50 ppm of hydroquinone was added, stirred intimately to give unsaturated polyesterresin blend. Cured specimens were prepared, and the LOI and self-extinguishing were measured by the same method. The results are also summarized in Table 1.

TABLE 1

|  | LOI | Self-extinguishing |
|---|---|---|
| Example 1 | 22 | O |
| Example 2 | 22 | O |
| Example 3 | 24 | O |
| Example 4 | 26 | O |
| Comparative Example 1 | 18 | X |

According to the test standard of ASTM D2863, materials having a LOI larger than 21 are deemed as possessing self-extinguishing property. It is seen from the above Table 1 that all the cured specimens prepared by the polyester resin blend of the invention have a LOI larger than 21, indicating the polyester resin blend are self-extinguishing materials. On the contrary, the cured specimens prepared by the polyester resin blend of comparative example 1 have a LOI of 18.

What is claimed is:

1. A process for preparing a flame-retardant phosphorus-containing unsaturated polyester resin blend, comprising the following steps:
   (a) reacting
      (1) a phosphorus-containing monomer having the formula:

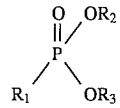

wherein $R_1$, $R_2$ and $R_3$ are respectively H, $C_1$–$C_4$ alkyl, phenyl, alkaryl or aralkyl, with
      (2) a saturated dicarboxylic acid, or a saturated dicarboxylic acid anhydride,
      (3) a double bond-containing unsaturated dicarboxylic acid or a double bond-containing unsaturated dicarboxylic acid anhydride, and
      (4) a diol
in the presence of a metal catalyst combined with an acid to form an unsaturated polyester oligomer having the formula:

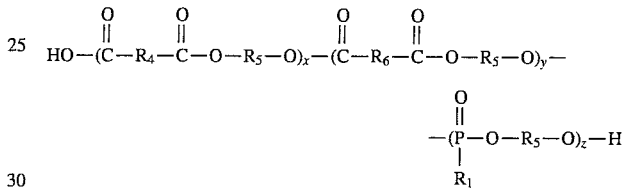

wherein
   $R_5$ and $R_6$ are respectively $C_1$–$C_4$ alkylene, alkarylene, phenylene or aralkylene,
   $R_4$ is a vinyl-containing group,
   x is an integer of 1–10,
   y is an integer of 1–10,
   z is an integer of 1–10, and
   (b) blending said unsaturated polyester oligomer with a vinyl-containing monomer.

2. The process as claimed in claim 1, wherein said metal catlyst is selected from the group consisting of an organo-tin compound and a metal oxide, and said acid is selected from the group consisting of toluene sulfonic acid, sulfuric acid, hydrochloric acid, phosphoric acid, and trichloro phosphate.

3. The process as claimed in claim 2, wherein the amount of said metal catalyst is 0.1–0.5 wt %, and the amount of said acid is 0.05–0.5 wt %, each based on the total amount of said saturated dicarboxylic acid or the anhydride thereof, and said unsaturated dicarboxylic acid or the anhydride thereof.

4. The process as claimed in claim 2, wherein said organo-tin compound is a compound selected from the group consisting of dibutyl tin oxide, dibutyl tin acetate, and tin chloride.

5. The process as claimed in claim 2, wherein said metal oxide is an oxide selected from the group consisting of an alkali metal oxide, an alkaline earth metal oxide, and a transit metal oxide.

6. The process as claimed in claim 1, wherein said double bond-containing unsaturated dicarboxylic acid or said double bond-containing unsaturated dicarboxylic acid anhydride is selected from the group consisting of maleic acid, maleic anhydride, fumaric acid, itaconic acid, citraconic acid, mesaconic acid, and aconic acid.

7. The process as claimed in claim 1, wherein said saturated dicarboxylic acid or saturated dicarboxylic acid anhydride is selected from the group consisting of orthophthalic acid, phthalic anhydride, isophthalic acid, tetrahydrophthlaic acid, hexahydrophthalic acid, tetrachlorophthalic acid, adipic acid, dimerized linseed oil fatty acid, and soy bean oil fatty acid, soy bean fatty acid anhydride, and a mixture thereof.

8. The process as claimed in claim 1, wherein said diol is selected from the group consisting of ethylene glycol, propylene glycol, dimethyl glycol, dipropylene glycol, 1,4-butanediol, neopentyl glycol, pentyl glycol, oxyalkylated bisphenol, hydrogened bisphenol, and a mixture thereof.

9. The process as claimed in claim 1, wherein the molar ratio of diol to total dicarboxylic acid is 1.03:1.0 to 3.0:1.0, the molar ratio of saturated dicarboxylic acid to unsaturated dicarboxylic acid is 0.05:0.95 to 0.95:0.05, and the molar ratio of phosphorus-containing monomer to dicarboxylic acid is 0.05:0.95 to 0.95:0.05.

10. The process as claimed in claim 1, wherein said vinyl-containing monomer is selected from the group consisting of styrene, methyl methacrylate, vinyl toluene, divinyl benzene, methyl acrylate, ethyl acrylate, ethyl methacrylate, n-butyl methacrylate, ethyl acrylate, n-butyl methacrylate, n-butyl acrylate, 2-ethyl hexyl acrylate, methacrylate, diallyl phthalate, diallyl fumarate, and vinyl acetate.

11. The process as claimed in claim 1, wherein the amount of said double bond-containing reactive monomer is 10–40 wt % of said unsaturated polyester oligomer.

12. The process as claimed in claim 1, wherein in step (b) an inhibitor is present.

13. The process as claimed in claim 12, wherein said inhibitor is selected from the group consisting of hydroquinone, benzoquinone, 1,4-naphthoquinone, 2,5-diphenyl-p-benzoquinone, and p-tert-butylpyrocatechol, and the amount of the inhibitor is 20–100 ppm.

14. The process as claimed in claim 1, wherein in step (a), a hindered phenol serving as a stabilizer is present.

15. The process as claimed in claim 12, wherein the amount of said hindered phenol is 0.01–0.5 wt % based on the total amount of the saturated dicarboxylic acid and unsaturated dicarboxylic acid.

* * * * *